(12) United States Patent
Evans et al.

(10) Patent No.: US 7,586,648 B2
(45) Date of Patent: Sep. 8, 2009

(54) VARIABLE-DOT HALFTONING

(75) Inventors: David J. Evans, London (GB); Ronald Veck, London (GB)

(73) Assignee: CADlink Technology Corporation, Ontario (CA)

(*) Notice: Subject to any disclaimer, the term of this patent is extended or adjusted under 35 U.S.C. 154(b) by 625 days.

(21) Appl. No.: 11/264,036

(22) Filed: Nov. 2, 2005

(65) Prior Publication Data

US 2006/0092472 A1 May 4, 2006

Related U.S. Application Data

(60) Provisional application No. 60/624,172, filed on Nov. 3, 2004.

(51) Int. Cl.
*H04N 1/405* (2006.01)
(52) U.S. Cl. ............. 358/3.06; 358/3.2; 358/1.16
(58) Field of Classification Search .......... 358/1.8, 358/1.9, 2.1, 3.06–3.09, 3.2–3.21, 1.15–1.16
See application file for complete search history.

(56) References Cited

U.S. PATENT DOCUMENTS

| 5,041,920 A | 8/1991 | Hayes et al. |
| 5,291,311 A | 3/1994 | Miller |
| 5,444,551 A | 8/1995 | Miller et al. |
| 5,586,203 A | 12/1996 | Spaulding et al. |
| 5,831,626 A | 11/1998 | Sano et al. |
| 5,920,407 A * | 7/1999 | Erickson et al. ............. 358/504 |
| 5,930,396 A | 7/1999 | Fiala et al. |
| 5,946,452 A | 8/1999 | Spaulding et al. |

* cited by examiner

*Primary Examiner*—Thomas D Lee
*Assistant Examiner*—Stephen M Brinich
(74) *Attorney, Agent, or Firm*—Greenblum & Bernstein, P.L.C.

(57) ABSTRACT

A method for enabling a program that communicates a document description from a composition system to a printing system to manage variable-dot halftones for use with variable-dot printing devices, comprising the steps of using a selected halftone cell size to choose an array comprising at least one string defining a halftone cell intensity value, said string comprising at least one pixel imbution value, wherein said pixel imbution value is in the range of 0 to P, wherein P is the number of physical appearances that a painted pixel can have; using a selected halftone cell intensity value to choose a string; and painting at least one pixel within a halftone cell according to a pixel imbution value within the chosen string.

13 Claims, 2 Drawing Sheets

2% shade for a 5X5 cell in accordance with the example

10% shade for a 5X5 cell in accordance with the example

No dot (value = 0)
Small pixel (value = 1)
Medium pixel (value = 2)
Large pixel (value = 3)

2% shade for a 5X5 cell in accordance with the example

10% shade for a 5X5 cell in accordance with the example

VARIABLE-DOT HALFTONING

CROSS-REFERENCE TO RELATED APPLICATIONS

The present application claims the benefit of U.S. Provisional Patent Application Ser. No. 60/624,172 filed Nov. 3, 2004, the contents of which are hereby incorporated in its entirety by reference.

STATEMENT REGARDING FEDERALLY SPONSORED RESEARCH OR DEVELOPMENT

Not applicable.

REFERENCE TO A "SEQUENCE LISTING"

Not applicable.

FIELD OF INVENTION

The invention relates to halftones and, in particular, it relates to extending a program that communicates a document description from a composition system to a printing system in a device-independent way to handle variable-dot halftones.

BACKGROUND

The majority of printers are 1-bit devices. This means they only have one shade of each primary colours-namely, Cyan, Magenta, Yellow and Black. (Black is normally not included as it helps on shadows but is not really a colour.) These devices can either put down the dot-a Cyan, Magenta or Yellow (CMY) dot-or not. By combining (overlaying) the CMY dots, a total of 7 colours can be created ($2^3$−1, since the absence of all three colours is no colour).

In order to create the effect of thousands or millions of colours, a process called screening is used, which arranges the dots to create the effect of more colours. The higher the resolution of the device, the more effective the screening is and, therefore, the more colours can be created. There are many different types of screening. Some examples are Error diffusion, Stochastic/Thresholds, and PostScript halftones.

Different devices require different types of screening in order to get the best output. For example, error diffusion and stochastic screens look great on inkjets, but the same screen used on thermal transfer printers produce horrible artifacts in the midtones. For this reason, it is more common to use traditional halftones on thermal transfer printers.

A halftone cell is a square group of pixels. To generate a bi-tonal halftone cell for a black-and-white output device (two tones: black and white), each pixel in the halftone cell is turned ON or OFF so the outcome will be a halftone cell with some pixels ON (black dot) and others OFF (white or blank dot). By relying on the fact that an observer's eye will spatially average over the pixel area, the effect of intermediate tone levels (shades of gray) is created.

The same principle is used to generate multi-tonal halftone cells to create the appearance of intermediate colour values. In a multi-tonal halftone cell, each pixel can assume any of the 8 tones, which are created by the overlaying of the CMY dots. (Here, no colour is counted as a tone since a blank dot has an effect on the overall outcome.) When the observer's eye spatially averages over the pixel area, the effect of intermediate color values (colour shades) is created.

The halftone cells, each representing an intermediate tone level (bi-tonal) or color value (multi-tonal), are conceptually tiled across the page so that any address within the page has a corresponding address within the halftone cell. This then acts as a mask controlling how ink is added to the output device. Output produced using this technique, when viewed from a suitable distance, fools the observer into perceiving many more shades than are present in reality.

To increase the number of shades (tone levels or colour values), different dot sizes are used. This is called "variable-dot halftoning." The variable-dot halftoning could be used with black-and-white or colour output devices. However, for simplicity, it will be explained with respect to the black-and-white output devices, which use bi-tonal halftone cells.

A black-and-white variable-dot output device, in addition to having the capability of turning a pixel within its bi-tonal halftone cell ON or OFF, has the ability to determine the size of each ON dot. For example, a variable-dot device that has 3 dot sizes has the ability to turn a dot OFF, ON-and-small, ON-and-medium, or ON-and-large. This, of course, substantially increases the number of tone levels that can be obtained. The device described in this example is referred to as a 2-bit device-meaning, 2 bits per pixel, the 2 bits representing the 4 ($2^2$) different states that a pixel can assume.

It should be easy for someone skilled in the art to see how the same principle could be applied to the colour output devices to extensively increase the number of colour values that can be obtained. A 3-bit device, for example, could be used to implement the overlaying of the CMY colours as discussed above. A pixel with 3 bits can assume up to 8 states ($2^3$).

A halftone is controlled by three parameters: frequency, angle and spot function (dot shape). Frequency (often referred to as LPI for Lines Per Inch) is the number of halftone cells per inch. For example, a frequency of 60 would give 60 cells every inch.

The size of a cell is determined by the frequency. At a resolution of 300 dpi (dots per inch), a frequency of 60 LPI would give a cell size of 5×5 pixels (300/60). At the same resolution, a frequency of 100 LPI would give a cell size of 3×3 pixels (300/100).

The number of colour shades that can be printed is determined by the size of the cell. A 5×5 cell can display 25 shades, and from this one can work out the total number of colours that can be produced. For a CMY device, this would be 25×25×25 ($25^3$).

EXAMPLES

At 300 dpi, 20 LPI gives a 15×15 cell and 225 shades available (300/20)

At 300 dpi, 60 LPI gives a 5×5 cell and 25 shades available (300/60)

At 300 dpi, 100 LPI gives a 3×3 cell and 9 shades available (300/100)

As can be readily seen from these examples, a lower LPI will give more shades of colour on the same resolution device. The lower the LPI, the more noticeable the cell, which also gives the effect of lower resolution. As one increases the LPI, one reduces the number of shades of colours but hides the cell. With a very high LPI, one would not have enough shades and creates a polarization effect on objects that use lots of colours.

Doubling the resolution on the third example above gives a 6×6 cell and 36 shades (600/100=6×6 cell=36 shades). Hence, higher resolution devices allows to run higher LPI; increasing the resolution, however, reults in longer time for the printer to print. Therefore, the best LPI depends on the resolution of the output device and what is being printed.

Besides frequency, the other two variables that make up a halftone cell are the angle and spot function. The angle allows one to rotate the cell on the page and the spot describes how the cell gets painted at the different percent levels.

The angle is used to offset the CMYK colours. Mainly, this affects the highlights and midtones. When Cyan, Magenta, Black, or a combination thereof is printed over Yellow on thermal devices, the Yellow tends to get overpowered. By using different angles for each CMYK, the dots of each colour are offset and the moiré is reduced.

The sorts of angles that are commonly used create what is known as a rosette pattern (C=108, M=161, Y=90, K=45). There are a lot of other combinations for producing a rosette. If one looks through a magnifying glass at any printed magazine, he or she will see the rosette pattern of the halftones. The downside of a rosette set of angles is they do tend to make the halftone cell more visible.

Typical spot functions (dot shapes) are round or square. More advanced spot functions allow the spot to go through several transitions of dot shape depending upon the percentage of tint.

By manipulating the three variables that create the halftone cell, the number of shades that can be obtained is increased.

The use of variable-dot halftoning is known in the prior art. Known prior art includes U.S. Pat. Nos. 5,291,311; 5,444,551; 5,586,203; 5,946,452; 5,930,396; 5,831,626; and 5,041,920. While the teachings of these cited art documents all relate to variable-dot halftoning, all of the methods taught by them are methods that are considerably complex and hard to implement, as well as difficult to debug or fix once implemented.

The complexities in implementing and supporting these methods translate directly into time and resource inefficiencies, and significant monetary consequences. This necessitates the need for a variable-dot halftone scheme that is uncomplicated and easy to implement and maintain. The present invention satisfies that need.

SUMMARY OF THE INVENTION

The present invention satisfies the above-described need by providing a method for enabling a program that communicates a document description from a composition system to a printing system to manage variable-dot halftones for use with variable-dot printing devices, comprising the steps of using a selected halftone cell size to choose an array comprising at least one string defining a halftone cell intensity value, said string comprising at least one pixel imbution value, wherein said pixel imbution value is in the range of 0 to P, wherein P is the number of physical appearances that a painted pixel can have; using a selected halftone cell intensity value to choose a string; and painting at least one pixel within a halftone cell according to a pixel imbution value within the chosen string.

The present invention provides the advantage of implementing a variable dot-halftone based on how a program that communicates a document description from a composition system to a printing system in a device-independent way (such as PostScript) defines a halftone.

Other advantages will suggest themselves to those skilled in the art.

BRIEF DESCRIPTION OF THE DRAWINGS

The invention, its organization, construction and operation will be best understood by reference to the following detailed description taken into conjunction with the accompanying drawings, in which.

DETAILED DESCRIPTION OF THE INVENTION

Figure 1:
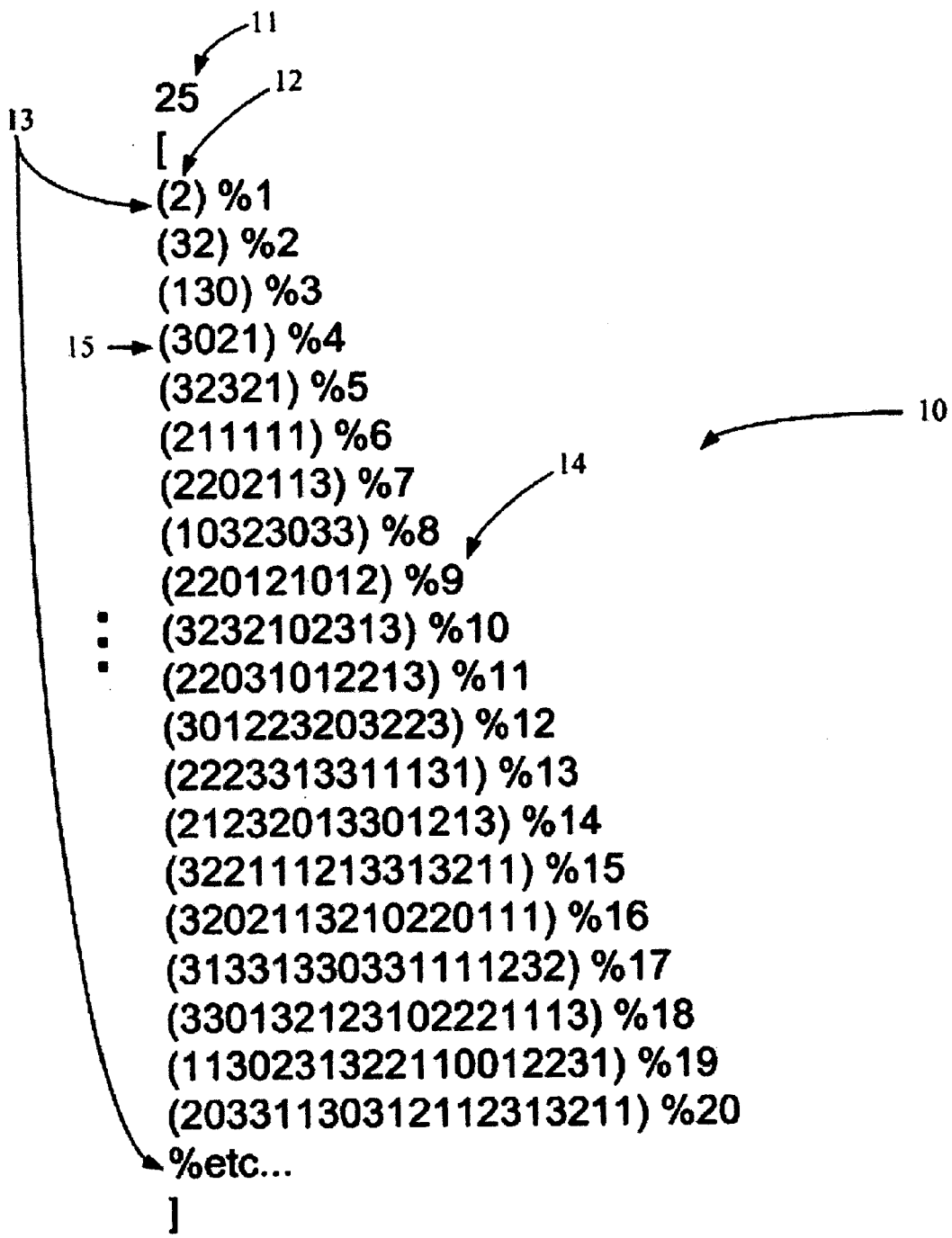
FIG. 1 shows an example of an array with size index of 25 (5×5) for a 2-bit device.

The following description is presented to enable any person skilled in the art to make use of the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Though this invention is described with the PostScript environment in mind, the general principles described herein are applicable to a broad class of printer languages and are not limited to implementations using PostScript. Further, although the following description has been all based around a halftone as defined by frequency, spot function and angle, the same principle can be used and applied to other methods of screen (e.g., threshold arrays).

It will be generally understood that the term "shade" as used in reference to a cell shade hereinafter may refer to a shade of grey or a colour shade, and is interchangeable with the term "cell intensity value." Also, it will be generally understood that the present invention can be used with black-and-white output devices as well as colour output devices, and although certain parts of the invention are described in reference to one of the black-and-white or colour environments, said parts will be as true for and applicable to the other environment. For example, a description on how to use the present invention with respect to "dot sizes" could be applied to use the present invention with respect to "colour depths."

PostScript is a programming language optimized for printing graphics and text (whether on paper, film, or CRT is immaterial). In the jargon of the day, it is a page-description language. The main purpose of PostScript is to provide a convenient language in which to describe images in a device-independent manner. This device independence means that the image is described without reference to any specific device features (e.g., printer resolution), so that the same description could be used on any PostScript printer (say, a LaserWriter or a Linotron) without modification.

PostScript's combination of technical merits and widespread availability made it the language of choice for graphical output: today, the PostScript language is a world standard for the printed page. A PostScript halftone has a common interface that has been implemented by numerous graphical application vendors in the market and allows great flexibility over the size and shape of the halftone for each colour.

The world of professional graphics applications and its users have become accustomed to controlling the PostScript halftone using this common user interface to select the line frequency, angle and spot function (dot shape). Therefore, instead of creating the variable-dot halftones from an initial point (from "scratch") as done in the above-cited prior art, the present invention expands the existing method used in the PostScript language for creating halftones in order to create variable-dot halftones-in other words, the present invention allows the users to carry on using this common interface but extends it to a variable-dot usage.

This common user interface (which could be found in CorelDraw, Illustrator, Quark, PhotoShop and various other major graphics application) gives the user control over the frequency, angle and halftone shape on a colour-by-colour basis and, therefore, provides the user with infinite options for his or her halftone cell. The key is to apply these three user-selected variables that make up the halftone to a variable-dot printing device.

In retrospect, there are various ways that a halftone cell can be defined. In the PostScript page-description language world, a halftone cell can be specified using three elements: frequency, which tells how many complete cells there are per inch and, therefore, when taking into account the physical resolution of the output device, tells how many device elements (pixels) the halftone cell comprises; angle, which specifies how the cell is rotated about one of its corners; and finally, spot function, which specifies the order in which the elements of the cell are to be filled in. The spot function supplies the means by which different numbers of elements within the halftone cell can be set according to saturation ("percentage shade"), and may also introduce various shapes and patterns within a cell to either make patterning as inconspicuous as possible, or to create some artistic or aesthetic effect.

The traditional digital output device for which this technology was devised is a 1-bit device-that is, each discrete picture element can be either ON or OFF only. The present invention takes the ideas presented so far and, in a non-complicated way, projects them onto a device capable of multiple levels at each discrete picture element address-an "N-bit device."

Another way of looking at this is that there is an existing mechanism for specifying a halftone cell in terms of its X and Y dimensions. This invention adds a simple way of specifying a third dimension, Z (where Z represents a dot size or colour depth).

The halftone cell for a device capable of more than 2 states at the picture element level needs to also specify the relevant N-bit pattern at each location within the halftone cell for a given shade.

This invention (1) establishes the cell filling order using the 1-bit method of Frequency, Angle and Spot Function (the "1-bit order"), or uses some other technique that derives a 1-bit order, and (2) uses the 1-bit order to expand this to an N-bit halftone cell. This is to say that the invention uses the method used for 1-bit devices to determine the order in which the pixels are to be painted (if there is only one pixel to be painted, the address of that pixel is obtained), and once the order of these pixels is obtained, it paints them according to the N-bit method—that is, making use of dot sizes or colour depths.

One must note that the invention could be implemented without step (1) of the preceding paragraph. This would be done by painting the pixels in a pre-determined order.

At its simplest, each picture element within the halftone cell (each pixel) is considered as either ON or OFF, regardless of the bit-depth-that is, each element might be either 0 (if the 1-bit order tells us it is OFF), or set to the value $2^N-1$ (if the 1-bit order tells us it is ON). For example, in a 2-bit device, a 0 would indicate that a pixel is OFF and a 3 would indicate that it is ON.

The aforementioned would result in a way of reproducing traditional halftoned output on an N-bit device, but would miss the opportunity of representing more colours within a given size of cell, or a means of showing the same number of colours within a smaller cell and thus boosting the effective resolution of the output device.

To achieve the latter, multiple arrays are created. An array is created for each halftone cell size (X by Y), and each array is referred to by its "size index," which is X multiplied by Y. For example, if the halftone cell size is 4×6, then an entry labelled 24 would be considered an exact match. If a given X by Y size index does not exist, the halftone cell size is rounded off to match an existing size index. For example, if the halftone cell size is 4×6, and a size index of 24 does not exist, then the X by Y size index is rounded off to match an existing size index (23, for example). FIG. 1 shows an example of an array 10 with size index of 25 (5×5) 11 for a 2-bit device. (As this is an array for a 2-bit device, the numbers 12 within the strings 13 of the array 10 range from 0 to 3 [$2^2-1=3$]. This will become clear after reading the following paragraphs.)

Each of these arrays has M array entries ("strings"), where M defines the number of shades available for a given cell size—"cell intensity values" available for output. The number of strings, M, might be equal to X times Y, however, this is not a requirement: the number of strings can be less or more than this. The M strings are cumulatively referred to as the "list of strings" or the "list."

The selection of a string 13 from the list is based on the shade selected by the user of the system. This shade is linearly mapped from its shade domain into the list domain 14 to find the string that is the closest match. This closest match could be achieved by rounding off the user's selected shade.

The string 13 is then used to build the halftone cell. Each string has a pattern of numbers 12 in the range 0 to $2^N-1$, each number used as the value with which to set the corresponding pixel within the halftone cell (such as dot size or colour depth)—that is, the "pixel imbution value." As mentioned above, the strings 13 of the array 10 shown in FIG. 1 have numbers 12 in the range of 0 to 3. For a 3-bit device, these numbers would range from 0 to 7 ($2^3-1=7$). Hence, the values of the numbers within the string are in the range of 0 to P, where P is the number of physical appearances that a painted pixel can have—of course, not counting the absence of a painted pixel as an appearance.

Referring again to the example of FIG. 1, with a cell size of 25 11, if a shade (cell intensity value) of 4% is selected by the user, the string "3021" 15 will be used. This means that the first pixel will be painted at full intensity ('3'), the next pixel will be OFF ('0'), the next one will be painted at medium intensity ('2'), and the last at low intensity ('1'). Note that this does not determine which pixels are going to have these intensities-which is the first pixel to be painted, which is the second, and so on. That is determined by the 1-bit order, as discussed above, or a pre-determined order would be used.

The number of values in the string should be less than or equal to the number of pixels in the cell; this, however, may or may not be the case. A string that is longer than there are pixels in the halftone cell is simply truncated to the length X times Y.

Figure 2A:
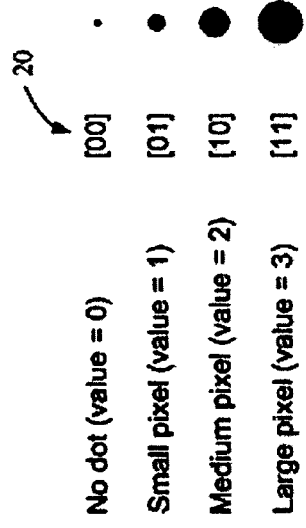
FIG. 2A is a dot-size index for a 2-bit device.
Figure 2B:
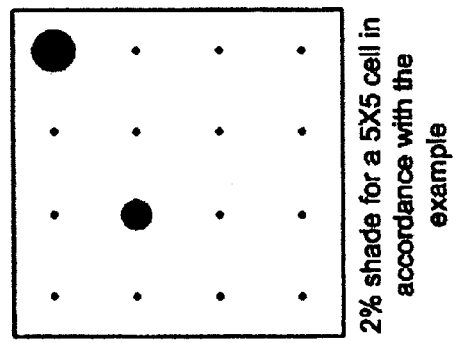
FIG. 2B shows one possibility of how a 2% shade may be painted with respect to the example of FIG. 1.
Figure 2C:
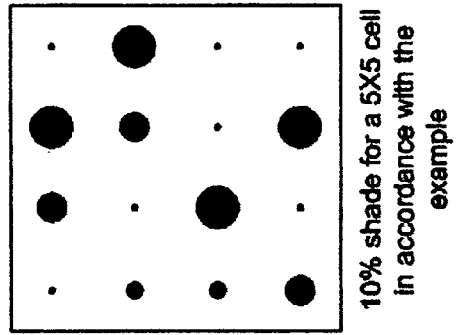
FIG. 2C shows one possibility of how a 10% shade may be painted with respect to the example of FIG. 1.

Therefore, the addresses in the halftone are taken from the 1-bit order (or are pre-determined), the values to be placed at those addresses are taken from the N-Bit string and the number of cells to actually set is taken from the string length. FIGS. 2B and 2C show possibilities of how a 2% shade and a 10% shade may be painted with respect to the example of FIG. 1, respectively. (FIG. 2A is a dot-size index showing examples of 2-bit values 20.) In a case where the number of pixel imbution values in the string is equal to or larger than the number of pixels in the cell, all of the pixels within the cell would be painted. (Not shown)

It should be clear that if a given X by Y size index does not exist and the halftone cell size is rounded down to match an existing size index, shorter strings will be used; if it is rounded up to match an existing size index, some string truncation might be involved.

In another implementation of the present invention, where a given X by Y size index is not found, instead of rounding off the X by Y size index to match an existing size index (as explained above), a smaller size index may be chosen and the entries in the string would be interpolated to fit the bigger halftone cell ("Interpolation Mapping").

Interpolation mapping may be either a simple replication of a string entry whenever sufficient error has built up to require an extra entry to be inserted, or may be an in-between value constructed from the current and next entries in the N-bit string.

If the size of the halftone cell exceeds the largest value in the shade domain, then either "simple mapping" or "interpolation mapping" is used to construct the halftone cell, according to the preference of the user.

An alternative way to select an array would be to do it in a three-dimensional manner. Either X or Y is used as a first lookup, then the remaining dimension is used as the second. At this point the relevant string list would be found.

Using this method, the dots sizes and/or colour depths could be customized for each pixel exactly, therefore providing the optimum number of shades even on a printer where the dot sizes are not linear (such as an inkjet).

The present invention does not define the size of the cell, the dot shape or its angle. It simply allows the PostScript halftone to make use of variable-dot printers. It offers a fully customizable system for any variable-dot printing device. Using this system, the number of shades is increased by at least 3 times (for a 2-bit device) and potentially more (for an N-bit device), depending upon the number of physical appearances a dot can assume.

Discussing the variable dot sizes, the above description related to three possible dot sizes. However, this should not be regarded as a restriction: the invention could be used with devices that offer any number of dot sizes. The invention could be used with a 3-bit device, for example, to manage up to 7 different dot sizes (or maybe, 3 dot sizes that come in 2 different shades, such as light black and dark black, which would result in 6 different types of dots). A similar argument applies to colour depths where there may be any number of primary colours overlayed in any way.

By using the above system, the number of shade can be increased at lower resolutions, allowing the printer to create the same quality separations as would be obtained at a higher resolution but much faster.

This technique works with all the variables of a traditional halftone and could be implemented for use with supercells. A supercell is another feature of a halftone where the cells are grouped into groups of 4 and then one shade in each one of these is turned on—by way of this invention—in order to give the illusion of more shades.

Other embodiments and uses of the invention will be apparent to those skilled in the art from consideration of the specification and practice of the invention disclosed herein. The specification and examples should be considered exemplary only and do not limit the intended scope of the invention.

I claim:

1. A method for enabling a program that communicates a document description from a composition system to a printing system to manage variable-dot halftones for use with variable-dot printing devices, comprising:
   using a selected halftone cell size to choose an array comprising at least one string defining a halftone cell intensity value, said string comprising at least one pixel imbution value, wherein said pixel imbution value is in the range of 0 to P, wherein P is the number of physical appearances that a painted pixel can have;
   using a selected halftone cell intensity value to choose a string; and
   painting at least one pixel within a halftone cell according to a pixel imbution value within the chosen string.

2. The method of claim 1, wherein the program is PostScript.

3. The method of claim 1, further comprising determining at least one address of a pixel to be painted.

4. The method of claim 1, wherein at least one address of a pixel to be painted is pre-determined.

5. The method of claim 3, wherein at least two pixels are to be painted and the method further comprises determining an order in which the pixels are to be painted.

6. The method of claim 3, wherein at least two pixels are to be painted and the pixels are painted in a pre-determined order.

7. The method of claim 1, wherein choosing an array comprises rounding off the selected halftone cell size to match a size index of an array.

8. The method of claim 1, wherein the number of pixel imbution values in the string is bigger than the number of pixels in the halftone cell, and the method further comprises truncating the string.

9. The method of claim 1, further comprising: choosing an array with a size index smaller than the selected halftone cell size; and interpolating the pixel imbution values in the string to fit a halftone cell wit the selected halftone cell size.

10. The method of claim 1, wherein choosing a string comprises rounding off the selected halftone cell intensity value.

11. The method of claim 4, wherein at least two pixels are to be painted and the method further comprises determining an order in which the pixels are to be painted.

12. The method of claim 4, wherein at least two pixels are to be painted and the pixels are painted in a pre-determined order.

13. The method of claim 7, wherein the number of pixel imbution values in the string is bigger than the number of pixels in the halftone cell, and the method further comprises truncating the string.

* * * * *